United States Patent
Kahn et al.

(10) Patent No.: US 11,678,288 B2
(45) Date of Patent: Jun. 13, 2023

(54) SYNCHRONIZATION OF TIME SENSITIVE COMMUNICATION HOLD-AND-FORWARD BUFFERS WITH TIME SENSITIVE COMMUNICATION ASSISTANCE INFORMATION

(71) Applicant: Nokia Technologies Oy, Espoo (FI)

(72) Inventors: Colin Kahn, Morris Plains, NJ (US); Devaki Chandramouli, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/387,456

(22) Filed: Jul. 28, 2021

(65) Prior Publication Data
US 2022/0046567 A1    Feb. 10, 2022

Related U.S. Application Data

(60) Provisional application No. 63/062,996, filed on Aug. 7, 2020.

(51) Int. Cl.
*H04W 56/00* (2009.01)

(52) U.S. Cl.
CPC ................. *H04W 56/005* (2013.01)

(58) Field of Classification Search
CPC .......... H04W 56/005; H04W 56/0075; H04W 56/00; H04L 47/00
USPC ...................................................... 370/350
See application file for complete search history.

(56) References Cited

U.S. PATENT DOCUMENTS

| 2003/0223434 A1* | 12/2003 | Hwang | H04L 27/2271 370/503 |
| 2020/0351804 A1* | 11/2020 | Moon | H04W 76/25 |
| 2021/0099341 A1* | 4/2021 | Moon | H04J 3/0667 |
| 2022/0014296 A1* | 1/2022 | Wang | H04W 56/001 |

FOREIGN PATENT DOCUMENTS

| WO | 2021/137039 A1 | 7/2021 |
| WO | WO-2022008086 A1 * | 1/2022 |
| WO | WO-2022020020 A1 * | 1/2022 |

OTHER PUBLICATIONS

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.

(Continued)

*Primary Examiner* — Nathan S Taylor
(74) *Attorney, Agent, or Firm* — Nokia Technologies Oy

(57) ABSTRACT

A method and apparatus may include receiving, by a radio access network (RAN), at least one burst arrival time (BAT) parameter from at least one session management function (SMF). The method may further include determining, by the RAN, if at least one actual BAT is offset from the at least one received BAT parameter by at least one threshold. The method may further include setting, by the RAN, at least one BAT correction parameter based upon at least one offset time. The method may further include calculating, by the RAN, at least one new BAT parameter according to the one BAT correction parameter. The method may further include adjusting, by the RAN, at least one burst schedule based upon one or more of the at least one BAT correction parameter or the at least one new BAT parameter.

12 Claims, 7 Drawing Sheets

(56) References Cited

OTHER PUBLICATIONS

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V0.4.0, Jun. 2020, pp. 1-56.

"3rd Generation Partnership Project; Technical Specification Group Services and System Aspects; Study on enhancement of 5G System (5GS) for vertical and Local Area Network (LAN) services (Release 16)", 3GPP TR 23.734, V16.2.0, Jun. 2019, pp. 1-117.

"KI#3A, New Solution: Burst Arrival Time Adaptation", 3GPP TSG-SA WG2 Meeting #139e, S2-2004227, Agenda : 8.5, Qualcomm Incorporated, Jun. 1-12, 2020, pp. 1-2.

Extended European Search Report received for corresponding European Patent Application No. 21189784.8, dated Jan. 5, 2022, 12 pages.

"3rd Generation Partnership Project; Technical Specification Group Services and System Aspects; System architecture for the 5G System (5GS); Stage 2 (Release 16)", 3GPP TS 23.501, V16.5.1, Aug. 2020, pp. 1-440.

"Solution for the issue of hold and forward mechanism", 3GPP TSG-WG SA2 Meeting #137E e-meeting, S2-2002164, Huawei, Feb. 24-27, 2020, 6 pages.

\* cited by examiner

SYNCHRONIZATION OF TIME SENSITIVE COMMUNICATION HOLD-AND-FORWARD BUFFERS WITH TIME SENSITIVE COMMUNICATION ASSISTANCE INFORMATION

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for adjusting hold and forward buffers to align with deterministic flows.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include receiving, by a radio access network (RAN), at least one burst arrival time (BAT) parameter from at least one session management function (SMF). The method may further include determining, by the RAN, if at least one actual BAT is offset from the at least one received BAT parameter by at least one threshold. The method may further include setting, by the RAN, at least one BAT correction parameter based upon at least one offset time. The method may further include calculating, by the RAN, at least one new BAT parameter according to the one BAT correction parameter. The method may further include adjusting, by the RAN, at least one burst schedule based upon one or more of the at least one BAT correction parameter or the at least one new BAT parameter.

In accordance with certain embodiments, an apparatus may include means for receiving, by a radio access network (RAN), at least one burst arrival time (BAT) parameter from at least one session management function (SMF). The apparatus may further include means for determining if at least one actual BAT is offset from the at least one received BAT parameter by at least one threshold. The apparatus may further include means for setting at least one BAT correction parameter based upon at least one offset time. The apparatus may further include means for calculating at least one new BAT parameter according to the one BAT correction parameter. The apparatus may further include means for adjusting at least one burst schedule based upon one or more of the at least one BAT correction parameter or the at least one new BAT parameter.

In accordance with various embodiments, an apparatus may include at least one processor and at least one memory including computer program code. The at least one memory and the computer program code may be configured to, with the at least one processor, cause the apparatus to at least receive at least one burst arrival time (BAT) parameter from at least one session management function (SMF). The at least one memory and the computer program code may be further configured to, with the at least one processor, cause the apparatus to at least determine if at least one actual BAT is offset from the at least one received BAT parameter by at least one threshold. The at least one memory and the computer program code may be further configured to, with the at least one processor, cause the apparatus to at least set at least one BAT correction parameter based upon at least one offset time. The at least one memory and the computer program code may be further configured to, with the at least one processor, cause the apparatus to at least calculate at least one new BAT parameter according to the one BAT correction parameter. The at least one memory and the computer program code may be further configured to, with the at least one processor, cause the apparatus to at least adjust at least one burst schedule based upon one or more of the at least one BAT correction parameter or the at least one new BAT parameter.

In accordance with some embodiments, a non-transitory computer readable medium may be encoded with instructions that may, when executed in hardware, perform a method. The method may include receiving at least one burst arrival time (BAT) parameter from at least one session management function (SMF). The method may further include determining if at least one actual BAT is offset from the at least one received BAT parameter by at least one threshold. The method may further include setting at least one BAT correction parameter based upon at least one offset time. The method may further include calculating at least one new BAT parameter according to the one BAT correction parameter. The method may further include adjusting at least one burst schedule based upon one or more of the at least one BAT correction parameter or the at least one new BAT parameter.

In accordance with certain embodiments, a computer program product may perform a method. The method may include receiving at least one burst arrival time (BAT) parameter from at least one session management function (SMF). The method may further include determining if at least one actual BAT is offset from the at least one received BAT parameter by at least one threshold. The method may further include setting at least one BAT correction parameter based upon at least one offset time. The method may further include calculating at least one new BAT parameter according to the one BAT correction parameter. The method may further include adjusting at least one burst schedule based upon one or more of the at least one BAT correction parameter or the at least one new BAT parameter.

In accordance with various embodiments, an apparatus may include circuitry configured to receive at least one burst arrival time (BAT) parameter from at least one session management function (SMF). The circuitry may further be configured to determine if at least one actual BAT is offset from the at least one received BAT parameter by at least one threshold. The circuitry may further be configured to set at least one BAT correction parameter based upon at least one offset time. The circuitry may further be configured to calculate at least one new BAT parameter according to the one BAT correction parameter. The circuitry may further be configured to adjust at least one burst schedule based upon one or more of the at least one BAT correction parameter or the at least one new BAT parameter.

In accordance with some embodiments, a method may include receiving, by a network entity, from a network exposure function, at least one port management information container comprising at least one parameter. The method may further include setting, by the network entity, at least one hold and forward transmission buffering time according to any of the at least one received parameters. The method may further include receiving, by the network entity, at least one or more of a burst arrival time (BAT) correction parameter or the at least one new BAT parameter via an information container. The method may further include adjusting, by the network entity, the at least one hold and forward transmission buffering time according to the at least one or more of a BAT correction parameter or the at least one new BAT parameter.

In accordance with certain embodiments, an apparatus may include means for receiving from a network exposure function at least one port management information container comprising at least one parameter. The apparatus may further include means for setting at least one hold and forward transmission buffering time according to the at least one received parameters. The apparatus may further include means for receiving at least one or more of a burst arrival time (BAT) correction parameter or the at least one new BAT parameter via an information container. The apparatus may further include means for adjusting the at least one hold and forward transmission buffering time according to the at least one or more of a BAT correction parameter or the at least one new BAT parameter.

In accordance with various embodiments, an apparatus may include at least one processor and at least one memory including computer program code. The at least one memory and the computer program code may be configured to, with the at least one processor, cause the apparatus to at least receive from a network exposure function, at least one port management information container comprising at least one parameter. The at least one memory and the computer program code may be further configured to, with the at least one processor, cause the apparatus to at least set at least one hold and forward transmission buffering time according to the at least one received parameters. The at least one memory and the computer program code may be further configured to, with the at least one processor, cause the apparatus to at least receive at least one or more of a burst arrival time (BAT) correction parameter or the at least one new BAT parameter via an information container. The at least one memory and the computer program code may be further configured to, with the at least one processor, cause the apparatus to at least adjust the at least one hold and forward transmission buffering time according to the at least one or more of a BAT correction parameter or the at least one new BAT parameter.

In accordance with some embodiments, a non-transitory computer readable medium may be encoded with instructions that may, when executed in hardware, perform a method. The method may include receiving from a network exposure function, at least one port management information container comprising at least one parameter. The method may further include setting at least one hold and forward transmission buffering time according to the at least one received parameters. The method may further include receiving at least one or more of a burst arrival time (BAT) correction parameter or the at least one new BAT parameter via an information container. The method may further include adjusting the at least one hold and forward transmission buffering time according to the at least one or more of a BAT correction parameter or the at least one new BAT parameter.

In accordance with certain embodiments, a computer program product may perform a method. The method may include receiving from a network exposure function, at least one port management information container comprising at least one parameter. The method may further include setting at least one hold and forward transmission buffering time according to the at least one received parameters. The method may further include receiving at least one or more of a burst arrival time (BAT) correction parameter or the at least one new BAT parameter via an information container. The method may further include adjusting the at least one hold and forward transmission buffering time according to the at least one or more of a BAT correction parameter or the at least one new BAT parameter.

In accordance with various embodiments, an apparatus may include circuitry configured to receive from a network exposure function, at least one port management information container comprising at least one parameter. The circuitry may further be configured to set at least one hold and forward transmission buffering time according to the at least one received parameters. The circuitry may further be configured to receive at least one or more of a burst arrival time (BAT) correction parameter or the at least one new BAT parameter via an information container. The circuitry may further be configured to adjust the at least one hold and forward transmission buffering time according to the at least one or more of a BAT correction parameter or the at least one new BAT parameter.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for adjusting hold and forward buffers to align with deterministic flows is not intended to limit the scope of certain embodiments, but is instead representative of selected example embodiments.

Third Generation Partnership Project (3GPP) seeks to enhance wireless 5GS connectivity with fixed-line IEEE, Ethernet-based networks in industrial environments to provide scalability, improve flexibility, and lower total cost of ownership (TCO). For example, 3GPP has considered enhanced support of vertical and local area network (LAN) services, as well as the ability to transparently integrate 5GS as TSN bridge into an Ethernet network. This expansion has included 5GS serving as an IEEE TSN bridge with full protocol compatibility between 3GPP and IEEE TSN-bridged Ethernet networks. However, this expansion has introduced additional complexity into 5GS by placing new constraints on both 5GS and data networks to which 5GS connects.

3GPP has also given consideration towards adjusting TSC parameters and services to improve flexibility in supporting various networking scenarios beyond TSN. For example, an application function (AF) with knowledge of an application's requirements and end-station connectivity via the 5GS may send TSC assistance information (TSCAI) to the RAN to optimize RAN scheduling. This may also configure 5GS hold and forward (HnF) buffers such that the 5GS transmits bursts with the proper timing.

In general, deterministic flows require transmissions within a specific time window. TSN bridges were standardized in 3GPP using HnF buffers in the UE/DS-TT for downlink flows, and in the UPF/NW-TT for uplink flows. By using various gate schedules that use gate open times, burst release times from the HnF may be determined. As a result, jitter in 5GS may be absorbed by the HnF buffer, whereby packets may arrive at the 5GS egress within the packet data budget (PDB).

Figure 1:
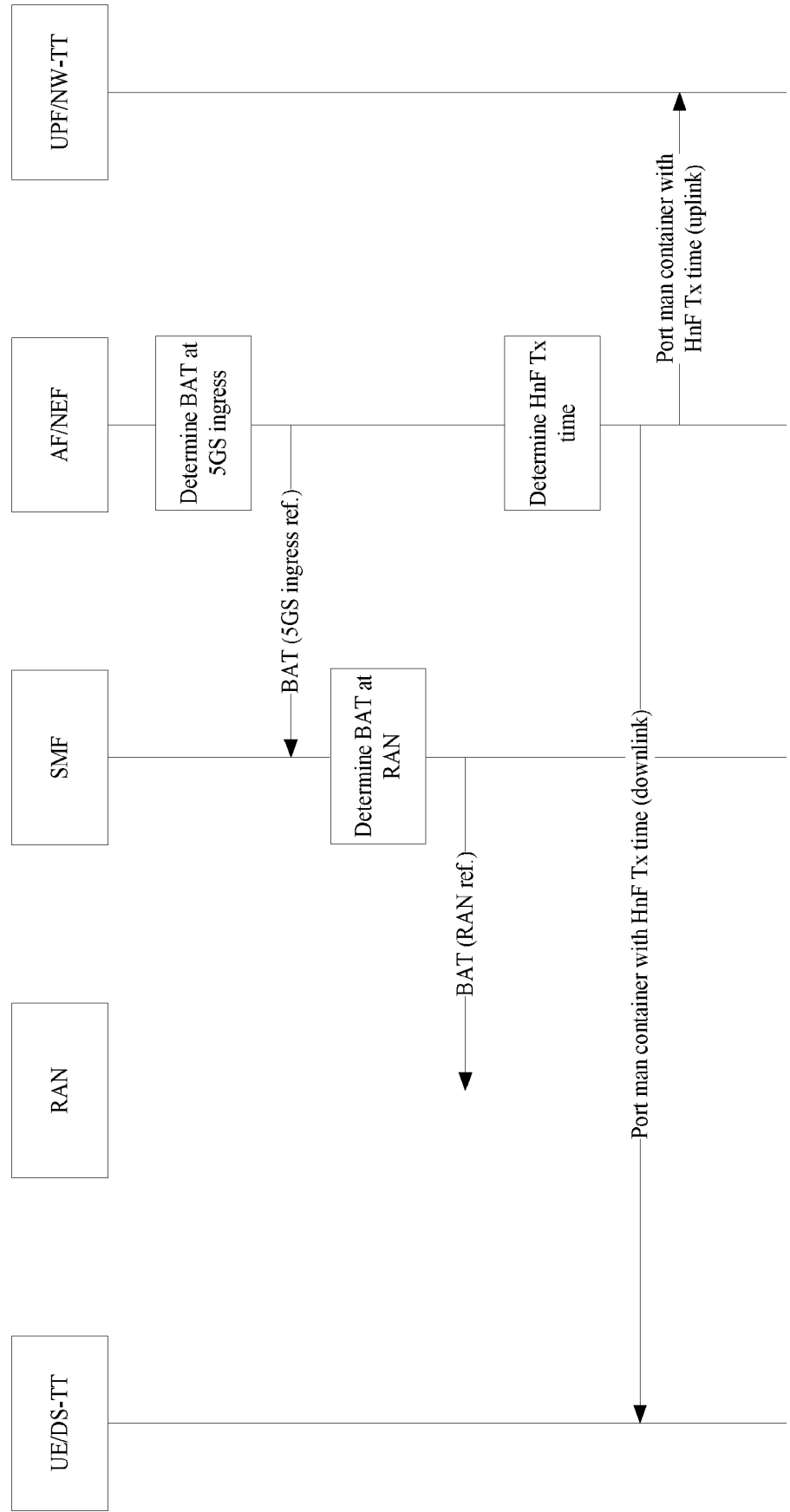
FIG. 1 illustrates an example of a 5GS timing configuration procedure for native time sensitive communications.

Native 5GS TSC lacks support for IEEE 802.Qci PSFP information and IEEE 802.Qbv gate schedules from which to derive BAT and HnF buffer parameters. Instead, an AF that requests TSC services must determine a suitable BAT, and calculate an acceptable HnF buffer Tx time window. For example, the window may be defined by an HnF First_Open Time and HnF First_Close Time. This configuration may follow the procedure illustrated in FIG. 1, which is similar to 3GPP Rel-16 procedure. However, an AF/NEF may not have 802.1Qci PSFP information in which to base 5GS ingress time, and may calculate a HnF Tx time window. In 3GPP Rel-16, 802.1Qbv managed objects received from a CNC may be transmitted to a UE/DS-TT or a UPF/NW-TT to configure HnF buffers. However, inaccuracies of the BAT and HnF Tx time determined by the AF/NEF, such as from an estimate of the 5GS delay source Tx timing information, may result in BAT and HnF Tx times that do not reflect the actual BAT in the RAN.

Some techniques have proposed the AF indicating support for burst arrival adaptation to 5GS. In this way, if the NG-RAN determines a need to adapt the burst arrival time, the NG-RAN may transmit an indication to the AF may include a burst arrival time offset value, for example of up to +/−2 ms. With respect to downlink flows, the AF may adapt the burst sending time based on the received offset. Alternatively, for uplink flows, the AF may request the source to adapt the burst sending time. However, this approach requires a source, network bridge, or UPF/NW-TT to adjust transmitting the deterministic flow according to NG-RAN timing. As a result, jitter may be introduced into the deterministic flow, and may additional delays may be added to the TSC flow such that burst arrivals in the RAN occur according to an initial erroneous calculation. This technique would also not be compatible with bridges, routers, sources, and UPF/NW-TTs which are not designed to alter the Tx time of an on-going flow according to an arbitrary external input.

Certain embodiments described herein may have various benefits and/or advantages to overcome the disadvantages described above. For example, certain embodiments may enable 5GS enabled for TSC to adapt to inaccuracies in calculated burst arrival times. For example, this may be applied towards native TSC procedures where no CNC exists to provide IEEE 802.1Qbv and 802.Qci information from which to derive timing references to a RAN and egress HnF buffers. Thus, certain embodiments discussed below are directed to improvements in computer-related technology.

Figure 2:
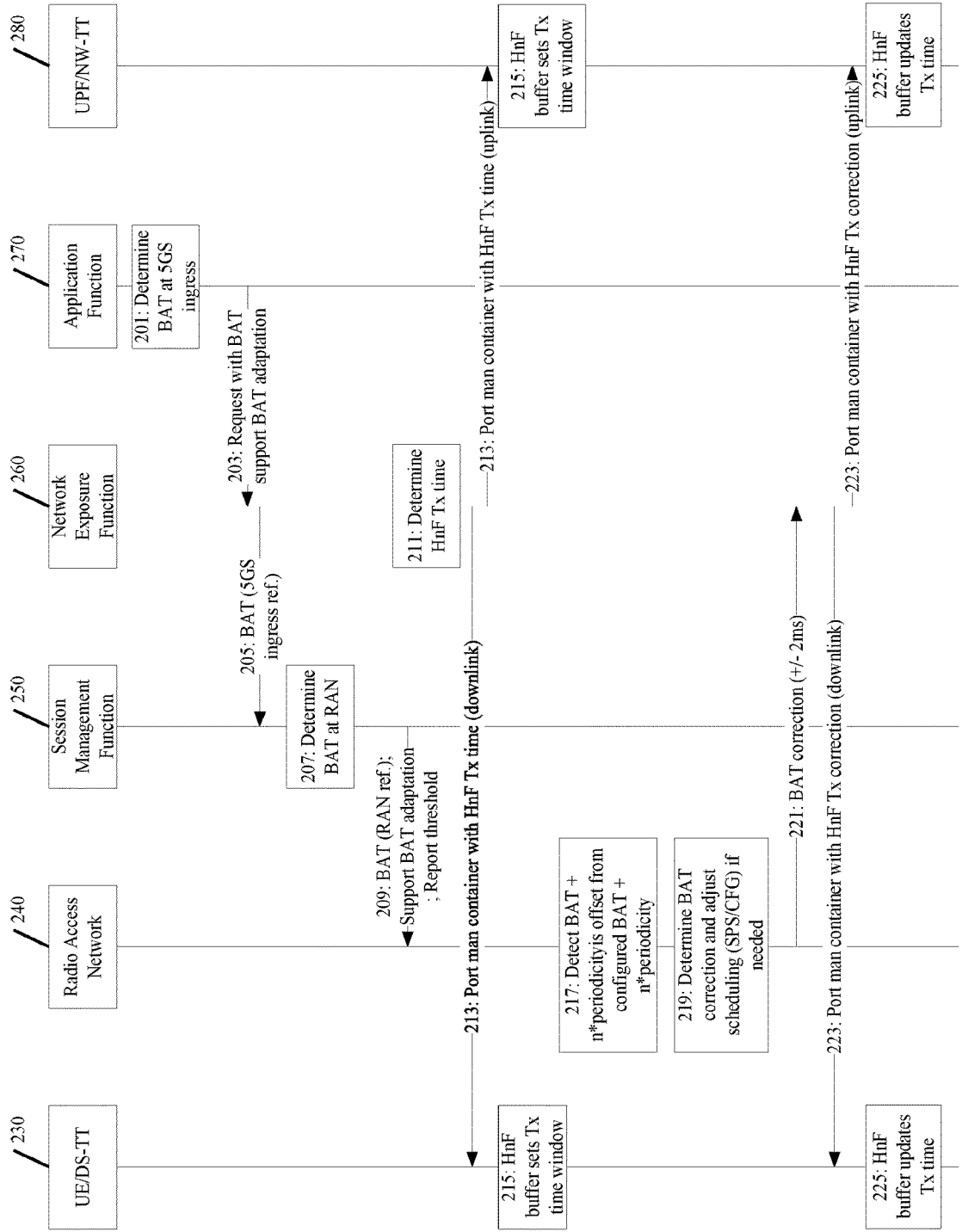
FIG. 2 illustrates an example of a signaling diagram according to certain embodiments.
Figure 6:
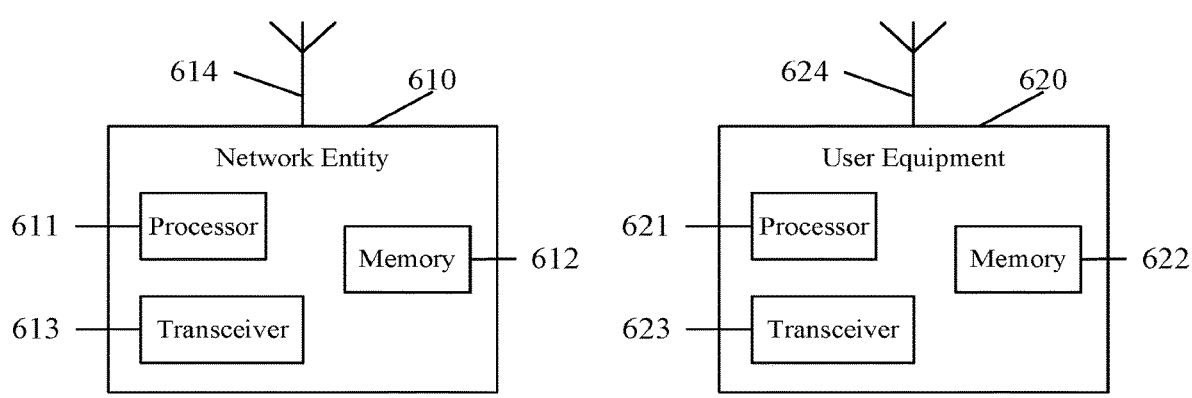
FIG. 6 illustrates an example of various network devices according to some embodiments.

FIG. 2 illustrates an example of a signaling diagram depicting how to adjust hold and forward buffers to align with deterministic flows. UE/DS-TT 230 may be similar to UE/DS-TT 620, while RAN 240, SMF 250, NEF 260, AF 270, and UPF/NW-TT 280 may be similar to NE 610, as illustrated in FIG. 6, according to certain embodiments.

At 201, AF 270 may determine at least one BAT at the ingress of a 5GS system. For example, AF 270 may determine the at least one BAT based upon a transit time of a source/talker, which may be adjusted for intermediate bridges/routers. At 203, AF 270 may transmit the at least one determined BAT, as well as information associated with other TSCAI parameters, to NEF 260.

At 205, NEF 260 may transmit the at least one determined BAT to SMF 250. In various embodiments, NEF 260 may also transmit at least one indication that NEF 260 supports transmitting BAT adaptation information in a PMIC. At 207, SMF 250 may adjust the at least one BAT from the ingress of the 5GS to the arrival time in RAN 240. For example, SMF 250 may perform this adjustment based on at least one PDB of the 5GS and/or a residence time of UE/DS-TT 230. At 209, SMF 270 may transmit to RAN 260 the at least one adjusted BAT, at least one other TSCAI parameter, at least one "support BAT Adaptation" parameter, and/or at least one "threshold BAT offset reporting" parameter.

At 211, NEF 260 may determine at least one HnF time based upon the at least one BAT, a periodicity for the 5GS, and/or the 5GS delay for UL/DL at UE/DS-TT 230 and/or UPF/NW-TT 280, which may be based upon a 5GS PDB and/or UE/DS-TT residence time. Alternatively, NEF 260 may forward any of the BATs, periodicities, burst ingress times, offsets to UE/DS-TT 230, and offsets to UPF/NW-TT 280 via at least one PMIC container. At 213, NEF 260 may transmit the PMIC containers to UE/DS-TT 230 and/or UPF/NW-TT 280. It is noted that the procedures performed at 211 and 213 may be performed before any of the procedures performed at 205-209.

At 215, based on whether UE/DS-TT 230 and/or UPF/NW-TT 280 received the PMIC at 213, UE/DS-TT 230 and/or UPF/NW-TT 280 may compute and set HnF Tx buffering times according to any of the parameters received at 211. At 217, RAN 240 may detect burst arrival times and/or may determine if the actual burst arrival times are offset from the BAT+n*Periodicity. In various embodiments, periodicity may be a TSCAI parameter indicating a period of the TSC stream, while "n" may be an integer. At 219, RAN 240 may set BAT correction parameters to equal an offset time, and may adjust its burst scheduling time in accordance with this adjustment.

At 221, if at least one report threshold is exceeded, RAN 240 may transmit the BAT correction parameters to SMF 250, which, at 223, may then be transmitted by SMF 250 to NEF 260/AF 270. At 223, NEF 260 may transmit the BAT correction parameters to UE/DS-TT 230 and/or UPF/NW-TT 280 via an information container, such as a port management information container. Additionally or alternatively, the BAT correction parameters may be sent to AF 270 to enable AF 270 to determine whether the 5GS delay requirement is satisfied. At 225, UE/DS-TT 230 and/or UPF/NW-TT 280 may adjust its HnF time according to the BAT correction parameters received at 223.

Figure 3:
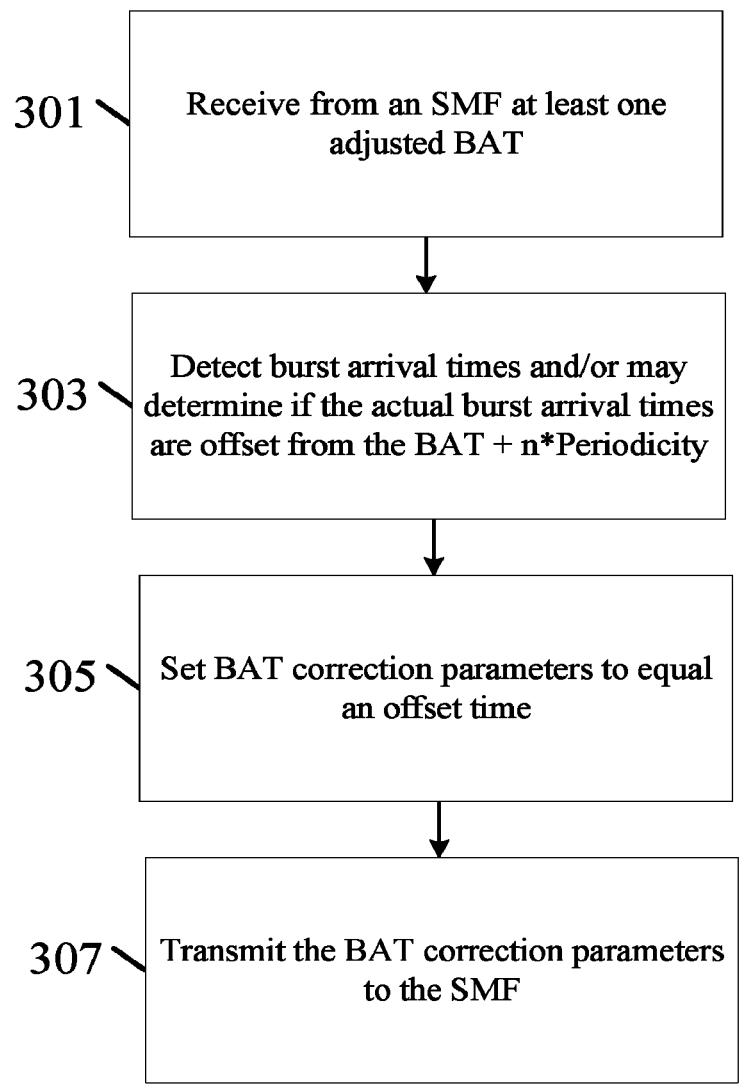
FIG. 3 illustrates an example of a flow diagram of a method according to various embodiments.

FIG. 3 illustrates an example of a flow diagram of a method that may be performed by a RAN, according to various embodiments. At 301, the RAN may receive from an SMF at least one adjusted BAT, at least one other TSCAI parameter, at least one "support BAT Adaptation" parameter, and/or at least one "threshold BAT offset reporting" parameter. The at least one adjusted BAT may be adjusted from an ingress of a 5GS to an arrival time in the RAN. For example, the SMF may have performed this adjustment based on at least one PDB of the 5GS and/or a residence time of a UE/DS-TT.

At 303, the RAN may detect burst arrival times and/or may determine if the actual burst arrival times are offset from the at least one received BAT parameter, such from BAT+n*Periodicity. In various embodiments, periodicity may be a TSCAI parameter indicating a period of the TSC stream, while "n" may be an integer. At 305, the RAN may set BAT correction parameters to equal an offset time, and may adjust its burst scheduling time in accordance with this adjustment. At 307, if at least one report threshold is exceeded, the RAN may transmit the BAT correction parameters to the SMF.

Figure 4:
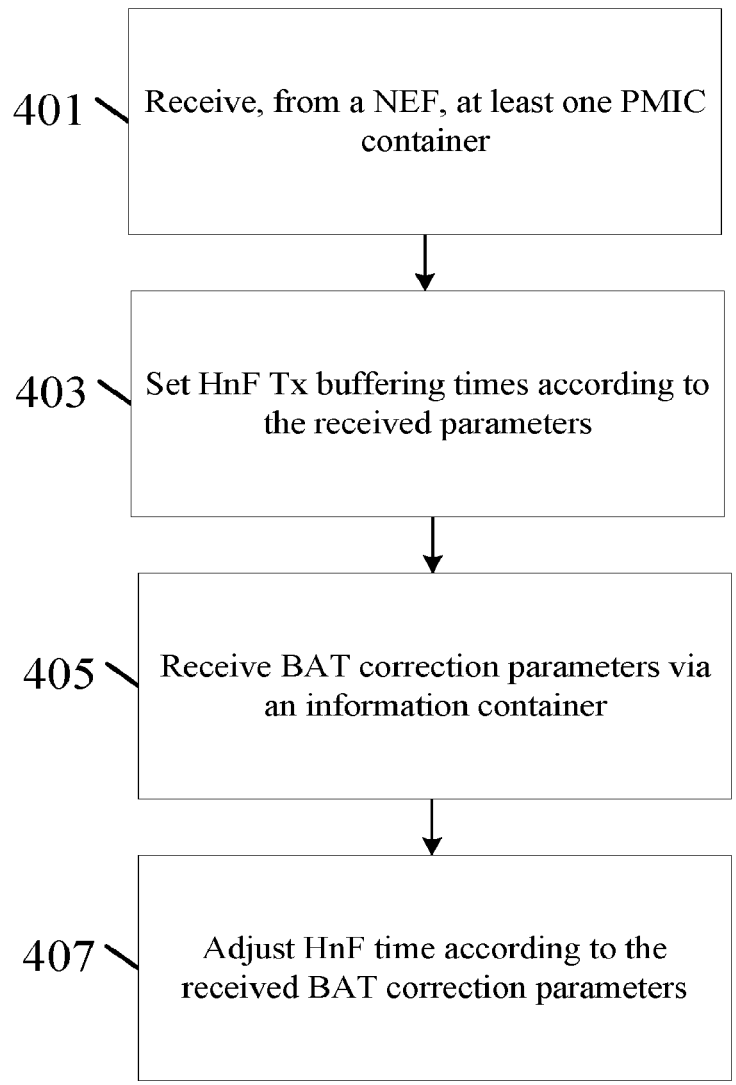
FIG. 4 illustrates an example of a flow diagram of a method according to some embodiments.

FIG. 4 illustrates an example of a flow diagram of a method that may be performed by a UE/DS-TT, such as UE/DS-TT 620 in FIG. 6, according to various embodiments. At 401, the UE/DS-TT may receive, from a NEF such as the NEF illustrated in FIG. 9, at least one PMIC container, which may include any number of BATs, periodicities, burst ingress times, and offsets.

At 403, the UE/DS-TT may compute and set HnF Tx buffering times according to any of the parameters received at 401. At 405, the UE/DS-TT may receive at least one or more of a BAT correction parameter or the at least one new BAT parameter via an information container, such as a port management information container. At 407, the UE/DS-TT may adjust its HnF time according to the BAT correction parameters received at 405 or the at least one new BAT parameter.

Figure 5:
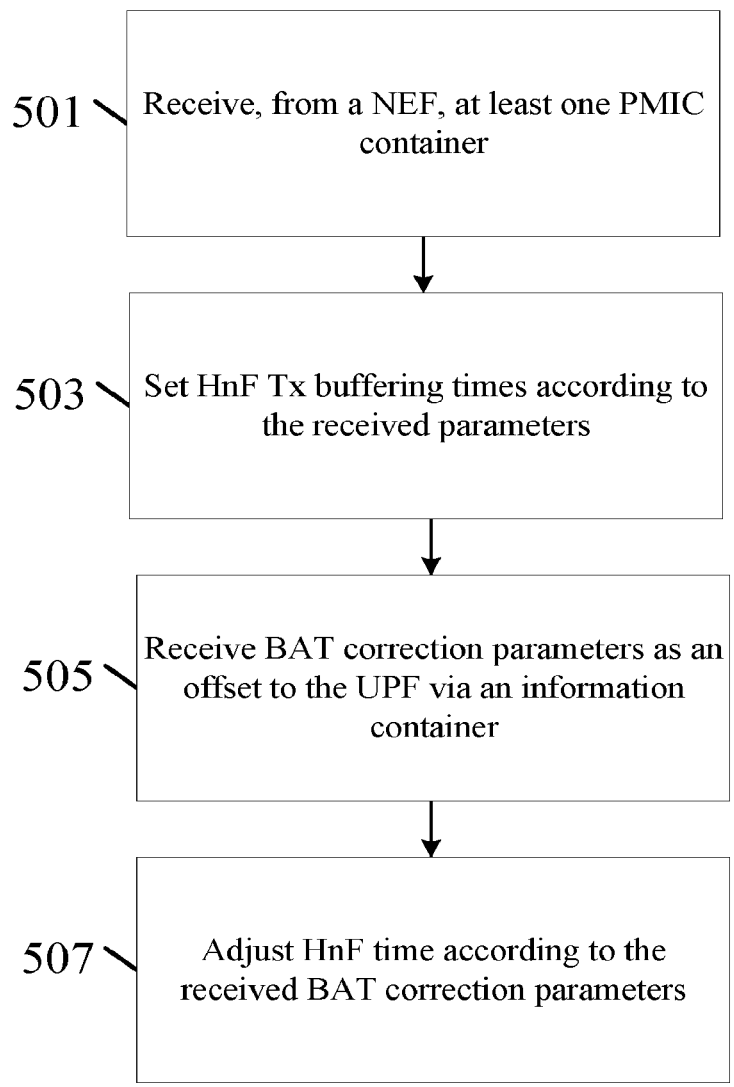
FIG. 5 illustrates an example of a flow diagram of a method according to some embodiments.
Figure 7:
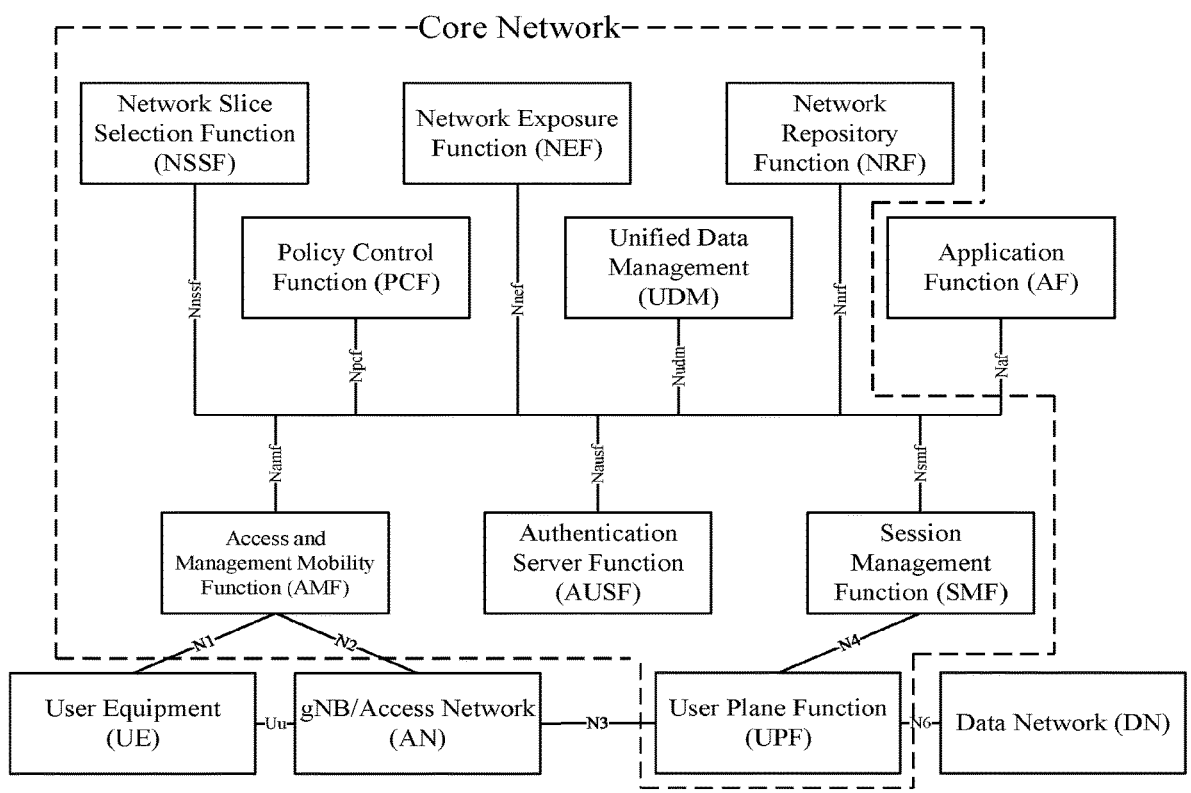
FIG. 7 illustrates an example of a 5G network and system architecture according to certain embodiments.

FIG. 5 illustrates an example of a flow diagram of a method that may be performed by a UPF/NW-TT, such as the UPF/NW-TT illustrated in FIG. 7, according to various embodiments. At 501, the UPF/NW-TT may receive, from a NEF, such as the NEF illustrated in FIG. 6, at least one PMIC container, which may include any number of BATs, periodicities, burst ingress times, and offsets.

At 503, the UPF/NW-TT may compute and set HnF Tx buffering times according to any of the parameters received at 501. At 505, the UPF/NW-TT may receive BAT correction parameters via an information container, such as a port management information container. At 507, the UPF/NW-TT may adjust its HnF time according to the BAT correction parameters received at 505.

FIG. 6 illustrates an example of a system according to certain example embodiments. In one example embodiment, a system may include multiple devices, such as, for example, NE 610 and/or UE/DS-TT 620.

NE 610 may be one or more of a base station, such as an eNB or gNB, a serving gateway, a server, and/or any other access node or combination thereof. Furthermore, NE 610 and/or UE/DS-TT 620 may be one or more of a citizens broadband radio service device (CBSD).

NE 610 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 620 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 610 and/or UE/DS-TT 620 may include at least one processor, respectively indicated as 611 and 621. Processors 611 and 621 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 612 and 622. The memory may be fixed or removable. The memory may include computer program instructions or computer code contained therein. Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 611 and 621, memories 612 and 622, and any subset thereof, may be configured to provide means corresponding to the various blocks of FIGS. 2-5. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple RATs. Other configurations of these devices, for example, may be provided. Transceivers 613 and 623 may be a transmitter, a receiver, both a transmitter and a receiver, or a unit or device that may be configured both for transmission and reception.

The memory and the computer program instructions may be configured, with the processor for the particular device, to cause a hardware apparatus, such as UE/DS-TT, to perform any of the processes described above (i.e., FIGS. 2-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 2-5. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

FIG. 7 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE/DS-TT illustrated in FIG. 7 may be similar to NE 610 and UE/DS-TT 620, respectively. The UPF/NW-TT may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
AF Application Function
AMF Access and Mobility Management Function
ASIC Application Specific Integrated Circuit
BAT Burst Arrival Time
BS Base Station
CBSD Citizens Broadband Radio Service Device
CE Control Elements
CG Configured Grant
CN Core Network
CPU Central Processing Unit
DL Downlink
DN Data Network
DS-TT Device Side Time Sensitive Networking Translator
E2E End-to-End
eMBB Enhanced Mobile Broadband
eMTC Enhanced Machine Type Communication
eNB Evolved Node B
eOLLA Enhanced Outer Loop Link Adaptation
EPS Evolved Packet System
gNB Next Generation Node B
GPS Global Positioning System
GTP General Packet Radio Service Tunneling Protocol
HDD Hard Disk Drive
HnF Hold and Forward
IEEE Institute of Electrical and Electronics Engineers
LTE Long-Term Evolution
LTE-A Long-Term Evolution Advanced
MAC Medium Access Control
MBS Multicast and Broadcast Systems
MC Multicast
MCS Modulation and Coding Scheme
MEMS Micro Electrical Mechanical System
MIB Master Information Block
MIMO Multiple Input Multiple Output
MME Mobility Management Entity
mMTC Massive Machine Type Communication
MPDCCH Machine Type Communication Physical Downlink Control Channel
MTC Machine Type Communication
NAS Non-Access Stratum
NB-IoT Narrowband Internet of Things
NE Network Entity
NEF Network Exposure Function
NG Next Generation
NG-eNB Next Generation Evolved Node B
NG-RAN Next Generation Radio Access Network
NR New Radio
NR-U New Radio Unlicensed
NW-TT Network Time Sensitive Networking Translator
OLLA Outer Loop Link Adaptation
PCF Policy Control Function PDA Personal Digital Assistance
PMIC Port Management Information Container
PSFP Per-Stream Filtering and Policing
RAM Random Access Memory
RAN Radio Access Network
RAT Radio Access Technology
RE Resource Element
RLC Radio Link Control
RRC Radio Resource Control
RS Reference Signal
SDU Service Data Unit
SMF Session Management Function
SPS Semi Persistent Scheduling
TR Technical Report
TS Technical Specification
TSC Time Sensitive Communication
TSCAI Time Sensitive Communication Assistance Information
Tx Transmission
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
VN Virtual Network
WLAN Wireless Local Area Network

We claim:

1. A method, comprising: receiving, by a network entity, from a network exposure function, at least one port management information container comprising at least one parameter; setting, by the network entity, at least one hold and forward transmission buffering time according to any of the at least one received parameter; receiving, by the network entity, at least one of a burst arrival time (BAT) correction parameter or at least one new BAT parameter via an information container; and adjusting, by the network entity, the at least one hold and forward transmission buffering time according to the at least one of the BAT correction parameter or the at least one new BAT parameter.

2. The method of claim 1, wherein the network entity comprises a user plane function, a device side time sensitive networking translator, or a network time sensitive networking translator.

3. The method of claim 1, wherein the at least one parameter comprises one or more of at least one BAT, at least one periodicity, or at least one offset.

4. The method of claim 2, wherein the at least one parameter comprises one or more of at least one BAT, at least one periodicity, or at least one offset.

5. An apparatus comprising: at least one processor; and at least one memory including computer program code, wherein the at least one memory and the computer program code are configured to, with the at least one processor, cause the apparatus at least to: receive from a network exposure function, at least one port management information container comprising at least one parameter; set at least one hold and forward transmission buffering time according to any of the at least one received parameter; receive at least one of a burst arrival time (BAT) correction parameter or at least one new BAT parameter via an information container; and adjust the at least one hold and forward transmission buffering time according to the at least one of the BAT correction parameter or the at least one new BAT parameter.

6. The apparatus of claim 5, wherein the apparatus comprises a user plane function, a device side time sensitive networking translator, or a network time sensitive networking translator.

7. The apparatus of claim 6, wherein the at least one parameter comprises one or more of at least one BAT, at least one periodicity, or at least one offset.

8. The apparatus of claim 5, wherein the at least one parameter comprises one or more of at least one BAT, at least one periodicity, or at least one offset.

9. A non-transitory computer-readable medium comprising instructions which when executed by at least one processor of an apparatus cause the apparatus to at least: receive from a network exposure function, at least one port management information container comprising at least one parameter; set at least one hold and forward transmission buffering time according to any of the at least one received parameter; receive at least one of a burst arrival time (BAT) correction parameter or at least one new BAT parameter via an information container; and adjust the at least one hold and forward transmission buffering time according to the at least one of the BAT correction parameter or the at least one new BAT parameter.

10. The non-transitory computer-readable medium of claim 7, wherein the apparatus comprises a user plane function, a device side time sensitive networking translator, or a network time sensitive networking translator.

11. The non-transitory computer-readable medium of claim 7, wherein the at least one parameter comprises one or more of at least one BAT, at least one periodicity, or at least one offset.

12. The non-transitory computer-readable medium of claim 11, wherein the at least one parameter comprises one or more of at least one BAT, at least one periodicity, or at least one offset.

* * * * *